United States Patent
Nakagomi et al.

[11] Patent Number: 6,099,426
[45] Date of Patent: Aug. 8, 2000

[54] BELT PULLEY

[75] Inventors: Akira Nakagomi; Shinobu Nishi, both of Fujisawa, Japan

[73] Assignee: Isuzu Motors Limited, Tokyo, Japan

[21] Appl. No.: 09/180,977

[22] PCT Filed: Mar. 19, 1998

[86] PCT No.: PCT/JP98/01191

§ 371 Date: Nov. 18, 1998

§ 102(e) Date: Nov. 18, 1998

[87] PCT Pub. No.: WO98/41784

PCT Pub. Date: Sep. 24, 1998

[30] Foreign Application Priority Data

Mar. 19, 1997 [JP] Japan .................................. 9-066302

[51] Int. Cl.[7] .............................. F16H 55/06; F16H 55/49
[52] U.S. Cl. ........................ 474/161; 474/170; 474/190; 474/179
[58] Field of Search .................................. 474/170, 177, 474/178, 190, 174, 179, 166, 187, 195, 161; 264/275, 242; D8/360

[56] References Cited

U.S. PATENT DOCUMENTS

| | | | |
|---|---|---|---|
| 5,507,698 | 4/1996 | Kuribayashi | 474/170 |
| 5,797,819 | 8/1998 | Arai | 474/190 X |
| 5,846,470 | 12/1998 | Funatsu et al. | 264/275 |

FOREIGN PATENT DOCUMENTS

| | | | |
|---|---|---|---|
| 51-85105 | 7/1976 | Japan . | |
| 60-59857 | 4/1985 | Japan . | |
| 62-180131 | 8/1987 | Japan . | |
| 5-22923 | 3/1993 | Japan . | |
| 6159480 | 6/1994 | Japan | 474/190 |
| 6185596 | 7/1994 | Japan | 474/190 |

OTHER PUBLICATIONS

Published International Application of Japan No. ISZ57.

*Primary Examiner*—Vinh T. Luong
*Assistant Examiner*—Mercus Charles
*Attorney, Agent, or Firm*—Rader, Fishman & Grauer PLLC

[57] ABSTRACT

A resin-made belt pulley (p) including a rim (2) over which a belt is engaged and a web (3) molded together with the rim and mounted on a rotating shaft, (1) extending through a position radially inside of the pulley, characterized in that a mounting position (30) of the web (2) on the rotating shaft (1) is offset (12) from the center (8) of the rim (2) in an axial direction, and the web (3) includes a vertical web portion (7) extending from the mounting position (30) of the web in a radially outward direction of the rotating shaft (1) and inclined web portions (9) diagonally connecting the vertical web portion (7) to the center (8) of the rim in the axial direction. Since a belt tension acting on the rim (2) is born at the center position (8) of the rim (2), deformation of the rim (2) caused by the belt tension can be minimized even if the pulley (p) is fabricated from resin which is a material of low rigidity.

4 Claims, 4 Drawing Sheets

FIG. 5
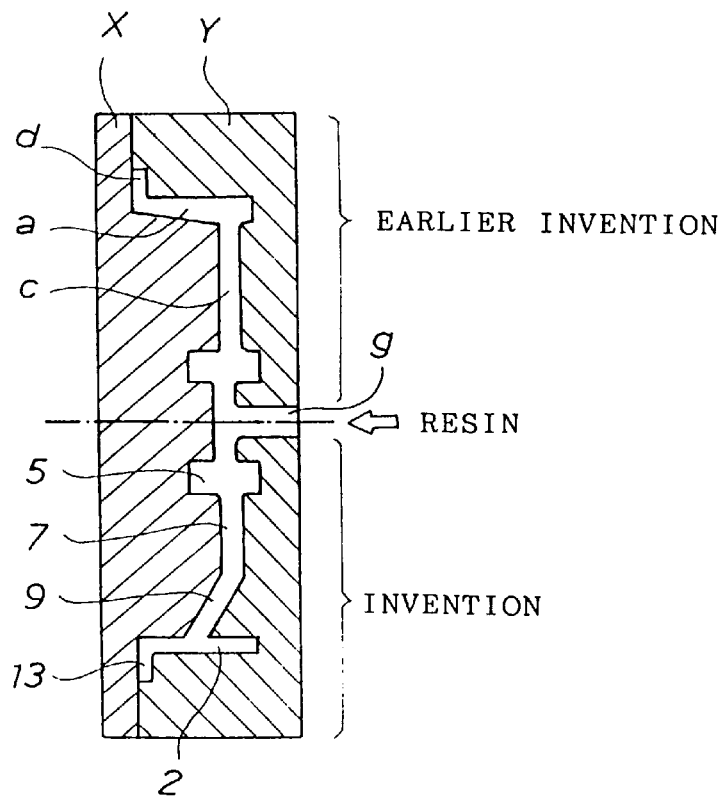
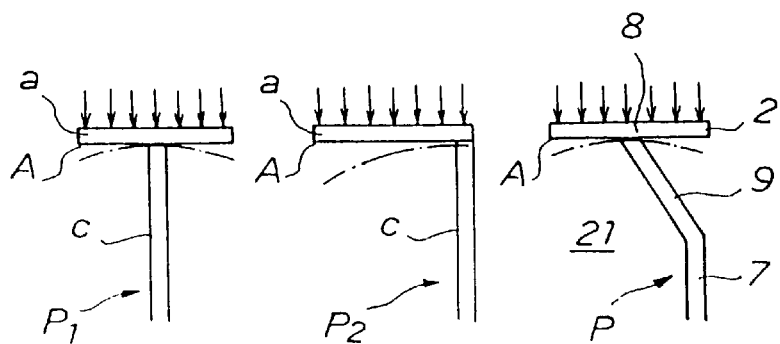
FIG. 6a　　FIG. 6b　　FIG. 6c
PRIOR ART

BELT PULLEY

TECHNICAL FIELD

The present invention relates to belt pulleys mounted on a cam shaft and a pump shaft of an engine for transmitting a drive force to the associated shafts.

BACKGROUND ART

A cam shaft of an engine or a rotating shaft of an auxiliary engine part such as a pump shaft has a pulley mounted thereon to transmit a drive force to the cam shaft (or pump shaft) from a crankshaft of the engine by means of a belt engaged over the pulley. As illustrated in FIG. 4a of the accompanying drawings, a pulley "p1" includes a cylindrical rim "a" over which a belt is engaged, and a web "c" mounted on a rotating shaft "b" extending through a radially inside position of the rim "a". The pulley is generally fabricated by sintering or the like.

At ends of the rim "a" in an axial direction, provided are flanges "d" and "e" for preventing the belt on the rim "a" from falling off. Among the flanges "d" and "e", the left flange "d" is molded integrated with the rim "a" and the right flange "e" is provided as a separate element (flange plate) "f". This is because both of the flanges "d" and "e" cannot be molded together with the rim "a" as molding dies cannot be separated.

The flange "d" integrated with the rim "a" preferably faces the engine or auxiliary part (indicated by the chain line) when the pulley "p1" is mounted on the cam shaft of the engine or the rotating shaft "b" of the engine auxiliary part. If the flange "e" were integrated with the rim, the belt must go over the flange "e" in attaching the belt to the pulley or removing the belt from the pulley. This would deteriorate easiness in engine assembling and maintenance.

Incidentally, demand for engine size reduction and weight reduction has been increasing year by year. In order to meet the demand, the inventors developed a pulley "p2" as illustrated in FIG. 4b, where the pulley is made of resin and has a web "c" offset from the center of a rim "a" in the axial direction. The weight of this pulley "p2" is reduced by the use of resin, and a projecting length L of the pulley can be reduced by offsetting the web "c" when mounted on the engine (chain line).

However, the inventors found the following problems when they fabricated and studied a prototype (a part made on an experimental basis) of the pulley "p2".

(1) As illustrated in FIGS. 6a and 6b, a load was applied to a belt engaging surface of the rim "a" of each pulley "p1" and "p2" shown in FIGS. 4a and 4b, and deflection at the rim end A was measured. Measured data are shown in the diagram of FIG. 3. As understood from this diagram, the deflection of the pulley "p2" is considerably greater than that of the pulley "p1" when the same load is applied. This is because a moment exerted on the rim end A increases as a result of offsetting the web "c", and the rim "a" cannot bear the moment as a result of using resin for the pulley.

Therefore, there is a following possibility; if the pulley "p2" is mounted on the engine and the engine is operated, a belt tension acting on the rim "a" may cause the rim "a" to tilt and consequently the belt may come into uneven contact with the pulley "p2". This may damage the belt (breakage in the worst case) or result in uneven wear of the pulley "p2" (breakage in the worst case).

(2) As illustrated in FIG. 5, the pulley "p2" is molded by injecting resin into molding dies X and Y, which are divisible in the pulley axial directions, from a resin inlet "g" at the pulley rotation center.

When the inventors tried to mold the flange "d", which prevents the belt from falling off, together with the pulley "p2" in FIG. 4b, resin injected from the inlet "g" was cooled on its way to the flange "d" via the web "c" and rim "a" (see the upper half in FIG. 5), which resulted in a lot of defective units without the flange "d". This is because a distance from the resin inlet "g" to the flange "d" is longer than the pulley "p1" in FIG. 4a as a result of offsetting the web "c".

Consequently, it is practically required to later attach the flange "f" (FIG. 4a) even to the side of the pulley "p2" which faces the engine. Thus, the number of necessary parts increases and the manufacturing cost inevitably increases particularly when the pulleys "p2" are mass produced. If the flange is to be formed on the opposite side of the pulley "p2", it can integrally be molded, but easiness in assembling and maintenance of the engine is deteriorated as mentioned earlier.

An object of the present invention, which was developed in consideration of the foregoing, is to provide a pulley that is able to minimize deformation caused by belt tension acting on a rim of the pulley even if the pulley is made of less rigid material, i.e., resin.

DISCLOSURE OF INVENTION

In order to attain the above object, the present invention provides a resin-made belt pulley that includes a rim over which a belt is engaged, and a web molded together with the rim and mounted on a rotating shaft extending through a position radially inside of the rim, and that is characterized by a mounting location of the web on the rotating shaft being offset from the center of the rim in the axial direction, and by the web including a vertical web portion extending from the mounting position of the web in a radially outward direction of the rotating shaft and an inclined web portion diagonally connecting the vertical web portion to the center of the rim in the axial direction.

According to the present invention, a belt tension acting on the rim is transferred to the vertical web portion via the inclined web portion connected to the center of the rim in the axial direction and in turn to the rotating shaft. In this manner, the belt tension on the rim is supported by the center of the rim in the axial direction so that deformation of the rim caused by the belt tension is minimized even if the pulley is fabricated from resin, which is a material of low rigidity. Therefore, it is possible to prevent uneven contact between the belt and the pulley, also to prevent damage of the belt and uneven wear of the pulley. In addition, a projecting length of the pulley in the axial direction after being mounted on the rotating shaft is not large.

One of two ends of the rim which is further in the axial direction from the web mounting position may have a flange integrally molded with the rim to prevent falling off of the belt. In such a design, the inclined web serves as a passage for the resin directed to the flange when the resin-made pulley is injection molded by injecting resin into a molding die. This reduces length of the resin passage. Consequently, it is feasible to prevent lack of resin in the flange, and the problem aforementioned can be eliminated. Thus, a yield is raised and a cost is reduced.

A plurality of inclined web portions may be spacedly provided on the vertical web portion at intervals in the circumferential direction. With such a design, surface rigidity of the web of the pulley is increased. Further, when flange plates are attached to the vertical web portion, they can be fastened at radially outward positions on the vertical web between the inclined web portions. This also improves mounting rigidity of the flange plates.

The vertical web portion may extend the intervals between the circumferentially spaced inclined web portions. The inclined web portions serve as reinforcing ribs so that surface rigidity of the web is raised.

Holes may be formed in the vertical web portion at positions between the inclined web portions so that the flange plates are attached using these holes in order to prevent falling off of the belt. This raises mounting rigidity of the flange plates.

An accommodation space may be formed radially inside of the rim by the inclined web portion(s) and vertical web portion on the opposite side of the offsetting. A projecting length of the pulley can be reduced since a protruding portion of the engine is received in the accommodation space.

BRIEF DESCRIPTION OF DRAWINGS

FIG. 5 illustrates a side cross sectional view of a pair of molding dies for molding a pulley.

FIG. 6a is a side cross sectional view of part of the conventional pulley to illustrate a belt tension acting on the pulley and a rim deforming.

FIG. 6b is a side cross sectional view of part of the earlier invention pulley to illustrate a belt tension acting on the pulley and a rim deforming.

FIG. 6c is a side cross sectional view of part of the invention pulley to illustrate a belt tension acting on the pulley and a rim deforming.

BEST MODE FOR CARRYING OUT THE INVENTION

Now, an embodiment of the present invention will be described in reference to the accompanying drawings.

Figure 1:
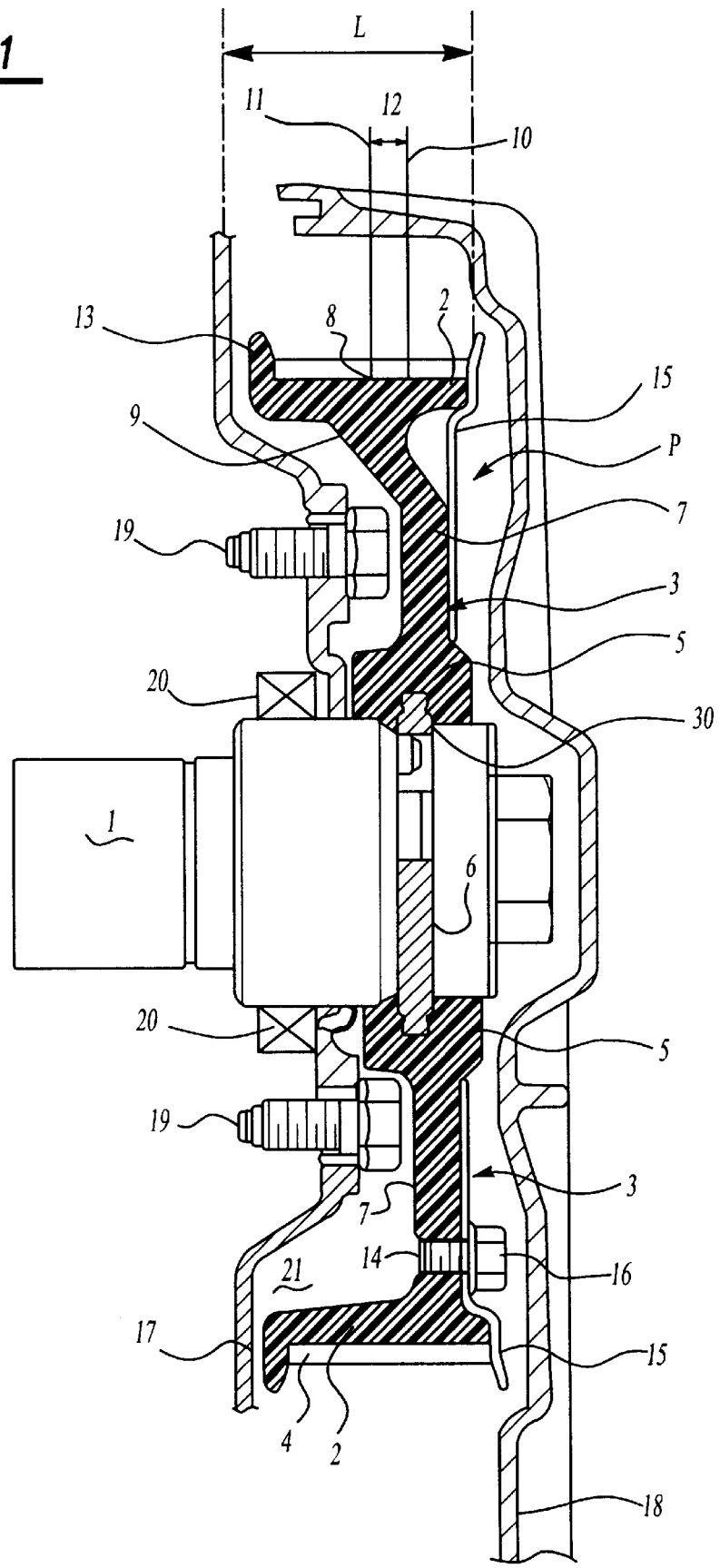
FIG. 1 illustrates a side sectional view of a pulley according to one embodiment of the present invention.
Figure 2A:
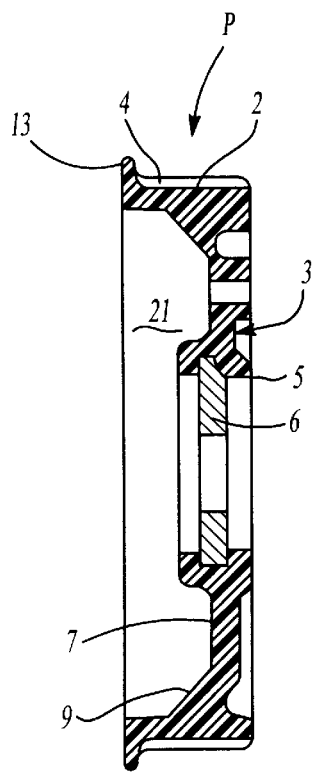
FIG. 2a is a cross sectional view of the pulley shown in FIG. 1 as taken along the a—a line in FIG. 2b.
Figure 2B:
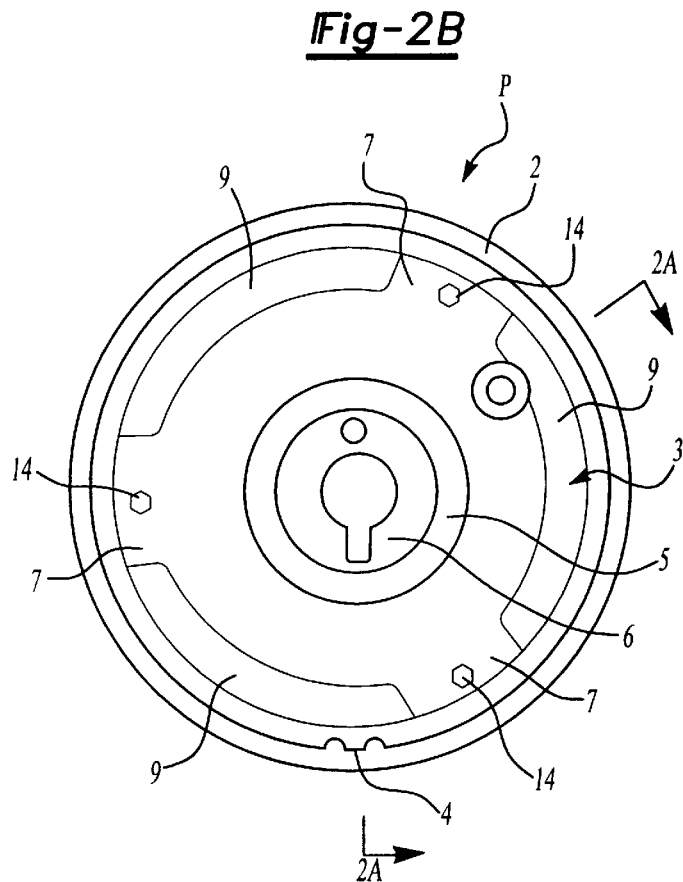
FIG. 2b illustrates a front view of the pulley shown in FIG. 1.
Figure 2C:
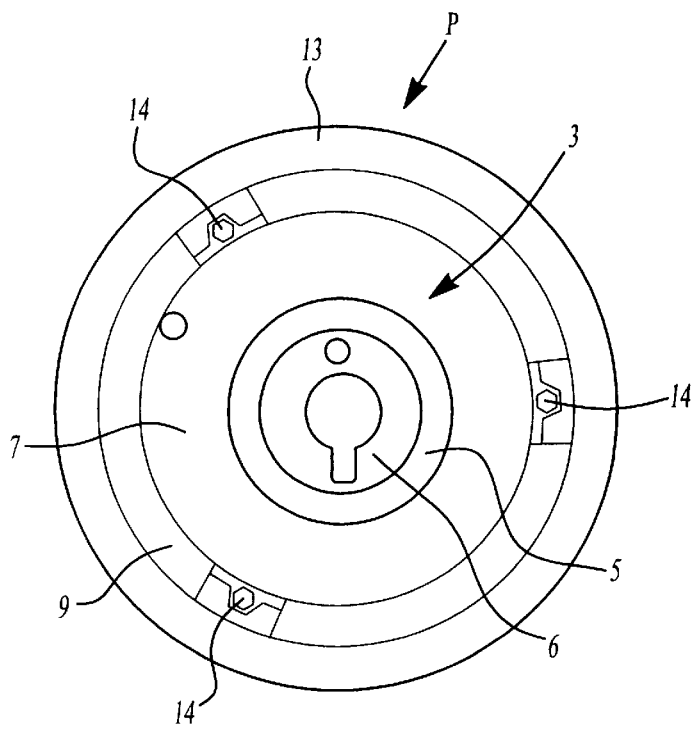
FIG. 2c illustrates a rear view of the pulley shown in FIG. 1.

As illustrated in FIG. 1, a pulley "p" is mounted on a cam shaft 1 of a diesel engine to drive the cam shaft 1. As also illustrated in FIGS. 2a to 2c, the pulley "p" is molded from resin and constituted by a rim 2 over which a belt is engaged, and a web 3 molded together with the rim and mounted on the rotating shaft 1 extending through a position inside the pulley. As shown in FIG. 2b, the rim 2 has teeth 4, and a toothed belt (timing belt) is engaged over the pulley "p" and a crank pulley mounted on a crankshaft of the engine.

The web 3 includes a hub 5 along its inner periphery, and the hub 5 is secured on the cam shaft 1 via a bushing 6 to prevent rotation. Specifically, the web 3 includes a vertical web portion 7 extending radially outward from the hub 5 and inclined web portions 9 connecting the vertical web portion 7 to the center 8 (FIG. 1) of the rim 2 in the axial direction. An extension line 10 (FIG. 1) from a mounting point 30 of the web 3 on the cam shaft 1 is offset (12) from an extension line 11 from the center 8 of the rim 2.

On the side of the rim 2 in the axial direction, which is further from the offset vertical web portion 7, integrally formed is a flange 13 to prevent the belt from falling off. As illustrated in FIG. 2b, the three inclined webs 9 are spacedly provided at 120-degree intervals in the circumferential direction of the vertical web 7. The circumferential length of the inclined web 9 is about three times as long as that of the vertical web 7.

Three screw holes 14 are formed in the vertical web 7 near the rim 2. As illustrated in FIG. 1, a flange plate 15 is attached by a bolt 16 screwed in each screwed hole 14 to prevent the belt from falling off from the opposite side of the integrated flange 13. In FIG. 1, a reference numeral 17 designates an inner belt cover, 18 an outer belt cover, 19 bolts for securing the inner belt cover and 20 an oil seal.

Now, an operation of this embodiment will be described.

A belt tension is exerted on the rim 2 of the pulley "p" by the belt engaging with the crank pulley and the pulley "p". As illustrated in FIG. 6c, the belt tension acting on the rim 2 is transmitted to the vertical web 7 via the inclined web 9 extending from the center 8 of the rim 2, and in turn to the rotating shaft 1. In this manner, the belt tension on the rim 2 is born at the center 8 of the rim 2 so that it is possible to minimize deformation of the rim 2 (displacement A of the rim end "a") caused by the belt tension even if the pulley is fabricated from resin which is a material of low rigidity.

Figure 3:
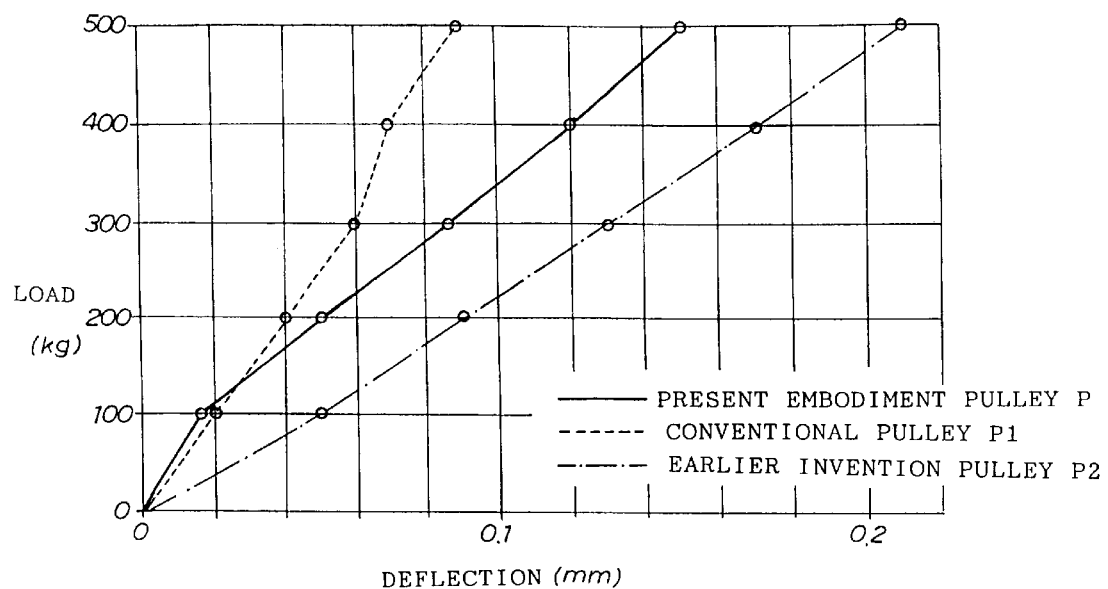
FIG. 3 is a diagram illustrating relationship between deflection of a pulley and a load.
Figure 4A:
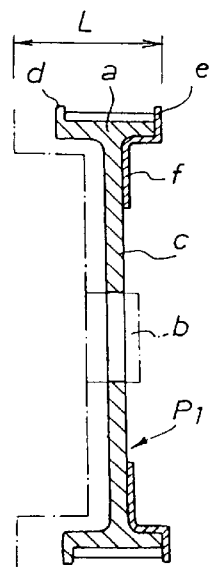
FIG. 4a illustrates a side cross sectional view of a conventional pulley.

Results of experiments are shown in FIG. 3. In this diagram, the solid line indicates data obtained from the pulley "p" of the present embodiment shown in FIG. 6c, the broken line indicates data obtained from the pulley "p1" according to the prior art shown in FIG. 6a, and the chain line indicates data obtained from the pulley "p2" according to the earlier invention shown in FIG. 6b. As understood from FIG. 3, the present invention pulley "p" deflects more than the conventional pulley "p1" of FIG. 6a but significantly less than the earlier invention pulley "p2" of FIG. 6b. It should be noted however that the conventional pulley "p1" of FIG. 6a is not preferable in terms of size and weight reduction of a vehicle body since the projecting length L in the engine axial direction is large as illustrated in FIG. 4a.

Figure 4B:
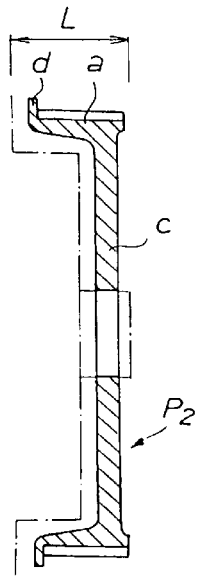
FIG. 4b illustrates a side cross sectional view of a pulley according to the earlier invention.

On the other hand, the pulley "p" of this embodiment shown in FIG. 6c has a shorter projecting length L in the engine axial direction (see FIG. 4b) like the earlier invention pulley "p2" of FIG. 6b since the vertical web 7 is offset and a space in the engine side of the vertical web can be used as an accommodation space 21 for the inner belt cover 17 and the bolts 19. In other words, the pulley "p" of this embodiment can attain both reduction of projecting length L in the engine axial direction and minimum deflection of the rim 2 caused by the belt tension. Therefore, it is feasible to suppress uneven contact between the belt and the pulley "p", damage to the belt and uneven wear of the pulley "p".

In addition, since the flange 13 is integrally molded at the end of the rim 2 further from the offset vertical web 7 to prevent the belt from falling off, the inclined webs 9 serve as passageways of resin being directed to the flange 13 from the resin inlet "g", and therefore the resin passageway is shortened when the pulley "p" is injection molded by injecting the resin into the molding dies X and Y as illustrated in the lower half of FIG. 5. Consequently it is possible to avoid shortage of resin in the flange "d" (13), which is the problem of the earlier invention pulley "p2" fabricated as shown in the upper half of FIG. 5. Thus, a yield is raised and the cost is reduced.

Further, since a plurality of inclined webs 9 are spacedly provided on the vertical web 7 in the circumferential direction, the inclined webs 9 serve as reinforcing ribs and raise plane rigidity of the web of the pulley "p". Moreover, the flange plates 15 are attached to the vertical web 7 as illustrated in FIG. 1 in such a manner that locations of the screw holes 14 for the mounting bolts 16 are at outer positions on the vertical web 7 between each adjacent inclined webs 9 as illustrated in FIGS. 2b and 2c, thereby raising mounting rigidity of the flange plates 15.

It is of course possible to form an inclined web 9 continuously extending in the circumferential direction on the vertical web 7, but in such a case, the screw holes 14 for the bolts 16 should be located nearer to the shaft avoiding the inclined webs 9. This might deteriorate mounting rigidity of the flange plates 15. On the other hand, if constructed like the present embodiment, the mounting rigidity of the flange plates 15 is enhanced so that the falling off of the belt is reliably prevented.

INDUSTRIAL APPLICABILITY

As described above, the present invention is preferably usable for a resin-made belt pulley mounted on the cam shaft or pump shaft to drive these shafts.

What is claimed is:

1. A resin-made belt pulley including:
   a rim over which a belt is engaged, the rim being comprised of resin; and
   a plurality of webs molded together with the rim, each web being comprised of resin and having a mounting portion to be mounted on a rotating shaft, the rotating shaft extending through a position radially inside of the pulley, characterized in that:
   a mounting position of each of the mounting portions of the webs mounted on the rotating shaft is offset from a center of the rim in the axial direction of the rotating shaft, the webs include first and second webs alternately arranged in a circumferential direction about the rotating shaft, each of said first webs includes a vertical web portion extending from a respective mounting portion in a radially outward direction of the rotating shaft and an inclined web portion connecting the vertical web portion to the center of the rim in the axial direction of the rotating shaft, and each of the second webs includes a vertical web portion extending to the rim from the mounting portion in a radially outward direction from the rotating shaft.

2. The belt pulley of claim 1, characterized in that one of two ends of the rim in the axial direction which is further from the web mounting position has a flange integrally molded with the rim to prevent falling off of the belt.

3. The belt pulley of claim 1, characterized in that an accommodation space is formed radially inward of the rim by the inclined and vertical web portions on the opposite side of the rim from that having an offset from the center of the rim in the axial direction.

4. The belt pulley of claim 1 characterized in that a hole is formed in each of the second webs near the rim, whereby a flange plate for preventing falling off of the belt is attachable to the belt pulley using the holes and suitable tightening elements.

* * * * *